US009019695B2

(12) United States Patent
Sun (10) Patent No.: US 9,019,695 B2
(45) Date of Patent: Apr. 28, 2015

(54) SUPPORT STAND AND ELECTRONIC DEVICE HAVING THE SAME

(75) Inventor: Tsai-Yun Sun, New Taipei (TW)

(73) Assignee: Wistron Corporation, New Taipei (TW)

( * ) Notice: Subject to any disclaimer, the term of this patent is extended or adjusted under 35 U.S.C. 154(b) by 251 days.

(21) Appl. No.: 13/607,457

(22) Filed: Sep. 7, 2012

(65) Prior Publication Data

US 2013/0155596 A1  Jun. 20, 2013

(30) Foreign Application Priority Data

Dec. 14, 2011 (TW) .............................. 100146293 A (51) Int. Cl.
*G06G 1/16* (2006.01)
*G06F 1/16* (2006.01)

(52) U.S. Cl.
CPC ................................... *G06F 1/1632* (2013.01)

(58) Field of Classification Search
CPC ... G06F 1/1633; G06F 1/1624; G06F 1/1637; G06F 1/166; H05K 5/0204; H05K 7/1492
USPC ....................... 345/173, 168, 520; 206/45.24; 361/679.01, 679.09, 679.32, 679.29
See application file for complete search history.

(56) References Cited

U.S. PATENT DOCUMENTS

| | | | | |
|---|---|---|---|---|
| 6,538,642 | B2 * | 3/2003 | Tsai .............................. | 345/168 |
| 6,690,353 | B2 * | 2/2004 | Chang ........................... | 345/156 |
| 6,700,775 | B1 * | 3/2004 | Chuang et al. ........... | 361/679.01 |
| 6,781,819 | B2 * | 8/2004 | Yang et al. ............... | 361/679.09 |
| 6,937,468 | B2 * | 8/2005 | Lin et al. .................. | 361/679.41 |
| 7,025,274 | B2 * | 4/2006 | Solomon et al. ......... | 235/472.01 |
| 7,567,432 | B1 | 7/2009 | Tabasso et al. | |
| 2002/0159226 | A1 * | 10/2002 | Huang et al. .................. | 361/680 |
| 2002/0171020 | A1 * | 11/2002 | Huang et al. ............. | 248/346.01 |
| 2004/0090742 | A1 * | 5/2004 | Son et al. ....................... | 361/686 |
| 2005/0083308 | A1 * | 4/2005 | Homer et al. ................. | 345/173 |
| 2005/0200608 | A1 * | 9/2005 | Ulla et al. ..................... | 345/168 |

(Continued)

FOREIGN PATENT DOCUMENTS

| | | |
|---|---|---|
| TW | 200917049 | 4/2009 |
| TW | M394494 | 12/2010 |
| TW | M410917 | 9/2011 |

OTHER PUBLICATIONS

English Translation of the Liu et al CN102214007 A, dated Oct. 2011, translated Jul. 9, 2014.*

(Continued)

*Primary Examiner* — Jayprakash N Gandhi
*Assistant Examiner* — Michael Matey
(74) *Attorney, Agent, or Firm* — Muncy, Geissler, Olds & Lowe, P.C.

(57) ABSTRACT

A support stand is disclosed. The support stand includes a first base body, a connecting member, a second base body, and a support member. The first base body includes an input device and a first electric connector, wherein the first electric connector is electrically connected to the input device. The connecting member is connected with the first base body. The second base body is connected with the connecting member, and the second base body is rotatable relative to the first base body via the connecting member. The support member is connected with the first base body, and it can balance the support stand when the first base body is not located on the same plane.

26 Claims, 9 Drawing Sheets

(56) References Cited

U.S. PATENT DOCUMENTS

| | | | |
|---|---|---|---|
| 2009/0094384 A1* | 4/2009 | Tao et al. | 710/2 |
| 2010/0172081 A1* | 7/2010 | Tian et al. | 361/679.29 |
| 2010/0271770 A1* | 10/2010 | Sellers | 361/679.08 |
| 2011/0267757 A1* | 11/2011 | Probst et al. | 361/679.09 |
| 2011/0317354 A1* | 12/2011 | Hung et al. | 361/679.09 |
| 2012/0051013 A1* | 3/2012 | Chao | 361/755 |
| 2012/0057288 A1* | 3/2012 | Chou et al. | 361/679.09 |
| 2012/0106061 A1* | 5/2012 | Probst et al. | 361/679.09 |
| 2012/0144977 A1* | 6/2012 | Morrissey et al. | 84/602 |
| 2012/0224316 A1* | 9/2012 | Shulenberger | 361/679.09 |
| 2012/0293939 A1* | 11/2012 | Wu et al. | 361/679.08 |
| 2012/0314342 A1* | 12/2012 | Sheu et al. | 361/679.01 |
| 2013/0070408 A1* | 3/2013 | Shen | 361/679.27 |
| 2014/0043743 A1* | 2/2014 | Liang | 361/679.09 |

OTHER PUBLICATIONS

TW Office Action dated May 20, 2014.

* cited by examiner

SUPPORT STAND AND ELECTRONIC DEVICE HAVING THE SAME

BACKGROUND OF THE INVENTION

1. Field of the Invention

The present invention relates to a support stand, especially a stand that is extendable, light-weight, and not cumbersome.

2. Prior Art

With the rapid development of computer technologies, the use of tablet computers has become widely popular. Although they are light-weight and not cumbersome, users need to hold them with their hands in order to keep them upright or tilted so that the tablet computers are face-on to the users when actually operating them. Therefore, when compared with the traditional laptop computers from the past, the monitors of which stay upright or tilted when they are placed on a desktop or on a lap, the tablet computers are not in accordance with the general users' habits of using laptops, nor with ergonomics. For this reason, in order to enable users to use tablet computers with more ease when it comes to long hours of use, support stands of all styles have been invented.

U.S. Pat. No. 7,567,432B1 reveals a support stand that not only makes the use of a laptop easier for the user, but also increases the functions of the laptop through the support stand, which is convenient. However, the support stand with the addressed patent cannot and does not need to be incorporated with the laptop computer which it supports as a single unit and be mobile. It merely provides the laptop a full size extended keyboard like one for a desktop computer. Meanwhile, it also merely provides the function of propping up the laptop computer by installing a foldable support. The support and the laptop computer are two independent units, and they function as separate devices. The support stand is useful only when the screen of the laptop is turned on. Also, it is rather inconvenient to transport the support stand. Because it uses a foldable support installed internally to prop up the laptop computer, it is thick and cumbersome. It is complex in the mechanism, and the procedure to go through when opening it up is quite complicated. Owing to the fact that it uses the oblique of a triangle in the mechanism, it cannot be adjusted to various angles for support as the user wishes.

SUMMARY OF THE INVENTION

It is the primary objective of the present invention to provide an extendable support which incorporates the tablet computer as a single unit and is light-weight, as well as being convenient for transportation in its first performance; it provides a support on which the tablet computer can lean and expands the functions of the computer in its second performance.

In order to achieve the above objective, the support stand of the present invention provides the installation and stabilization of a display device. In the present invention, the support stand comprises a first base body, a connecting member, a second base body, and a support member. The first body comprises an input device and a first electric connector, wherein the first electric connector connects with the input device electronically, which enables the display device to connect with the support stand electronically via the first electric connector. The connecting member is connected with the first base body; the second base body connects with the connecting member, and the second base body is rotatable relative to the first base body via the connecting member. The support stand is connected with the first base body. When the second base body rotates relative to the first base body, yet is not located on the same plane, it holds the balance of the support stand with the extension of the support member.

According to one of the embodiments of the present invention, the first base body of the support stand in the present invention further comprises a groove and a first retainer device, wherein the first electric connector is placed in the groove, which enables the second electric connector of the display device to be connected with the first electric connector electrically and simultaneously when the display device is placed in the groove with one end being against the side of the groove. The first retainer device is a magnetic component, which is used to attract the display device to intimately stabilize the support stand and the display device through the attraction of the magnetic component while the first base body and the second base body of the support stand are on the same plane and while the display device is intimately superposed on it.

According to an embodiment of the present invention, the second base body of the support stand in the present invention comprises at least a battery, a hole, a second retaining device, a flange, and at least one expansion port. At least one battery connects electrically with the first electric connector in order to supply power to the display device from the at least one battery while the display device electrically connects with the first electric connector. The hole holds the support stand while the first base body and the second base body are on the same plane. The second retaining device comprises at least one catch and a switch member, wherein the switch member is connected with at least one catch in order to control the movement of at least one catch via the switch member, and also to incorporate the display device, as well as stabilizing it onto the support stand with at least one catch being held in the buckle hole of the display device. On one side of the second base body is the flange, where there is the second retaining device, wherein the height of the flange is the same as the thickness of the display device. At least one expansion port is also placed around the flange in order to connect with other devices.

The electronic device in the present invention comprises the display device and the support stand stated above.

DETAILED DESCRIPTION OF THE PREFERRED EMBODIMENTS

In order to enhance the easy understanding of the purposes, characteristics and merits of the present invention stated above and elsewhere, embodiments of the present invention and detailed explanations in accordance with the figures attached are given.

Figure 1:
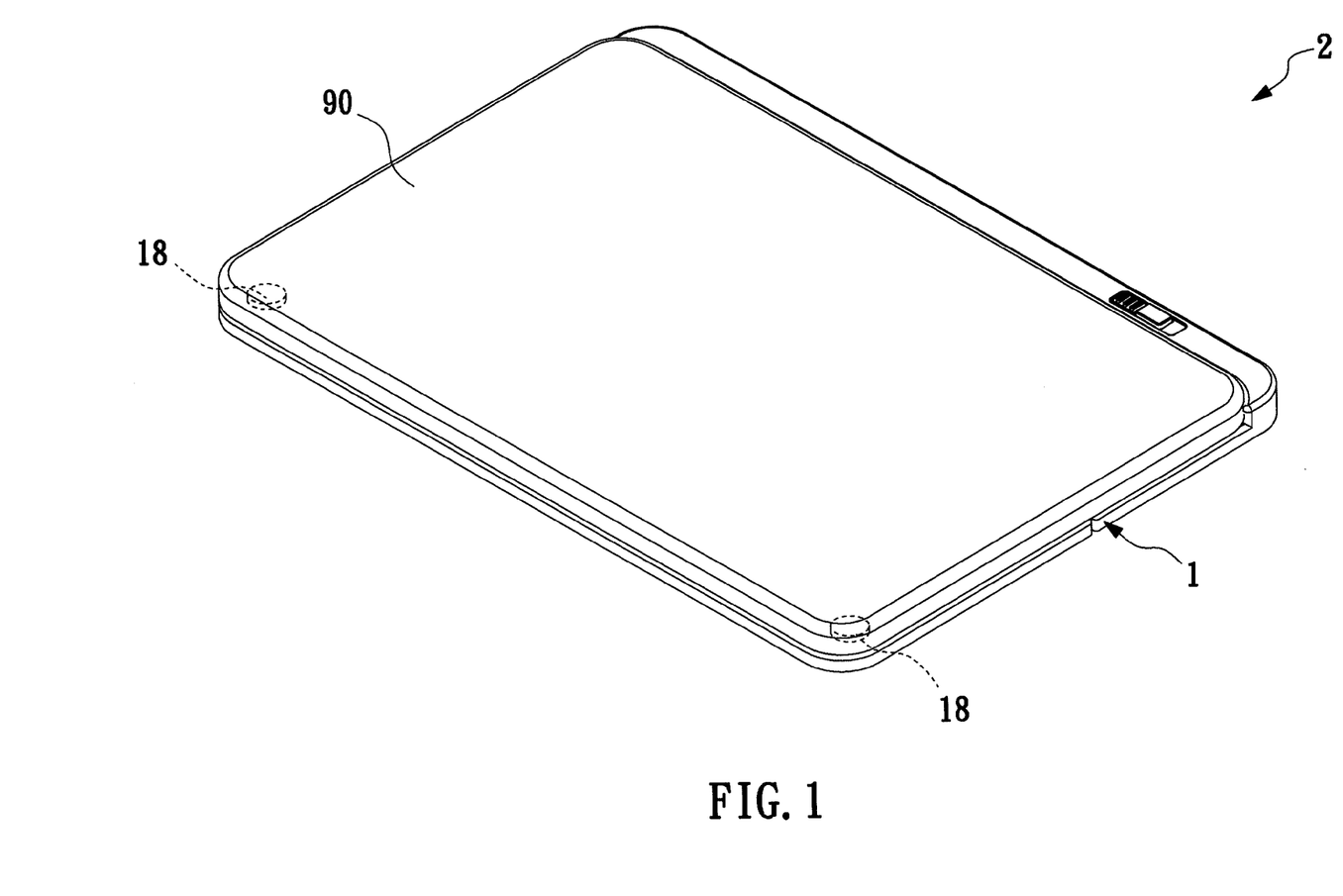
FIG. 1 is a downward vertical view of the electronic device of the present invention while it is not in use.
Figure 2:
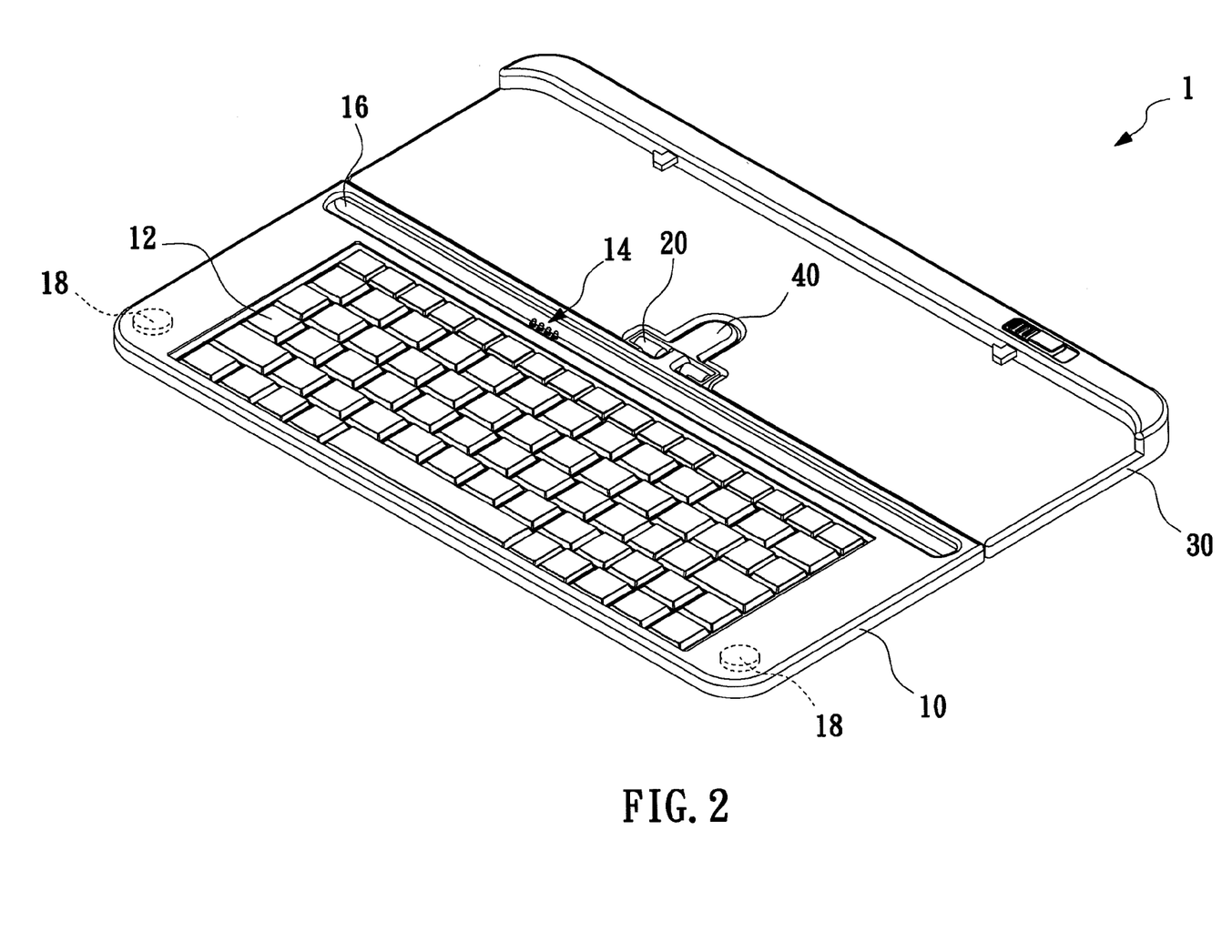
FIG. 2 is a downward vertical view of the support stand of the present invention.
Figure 3:
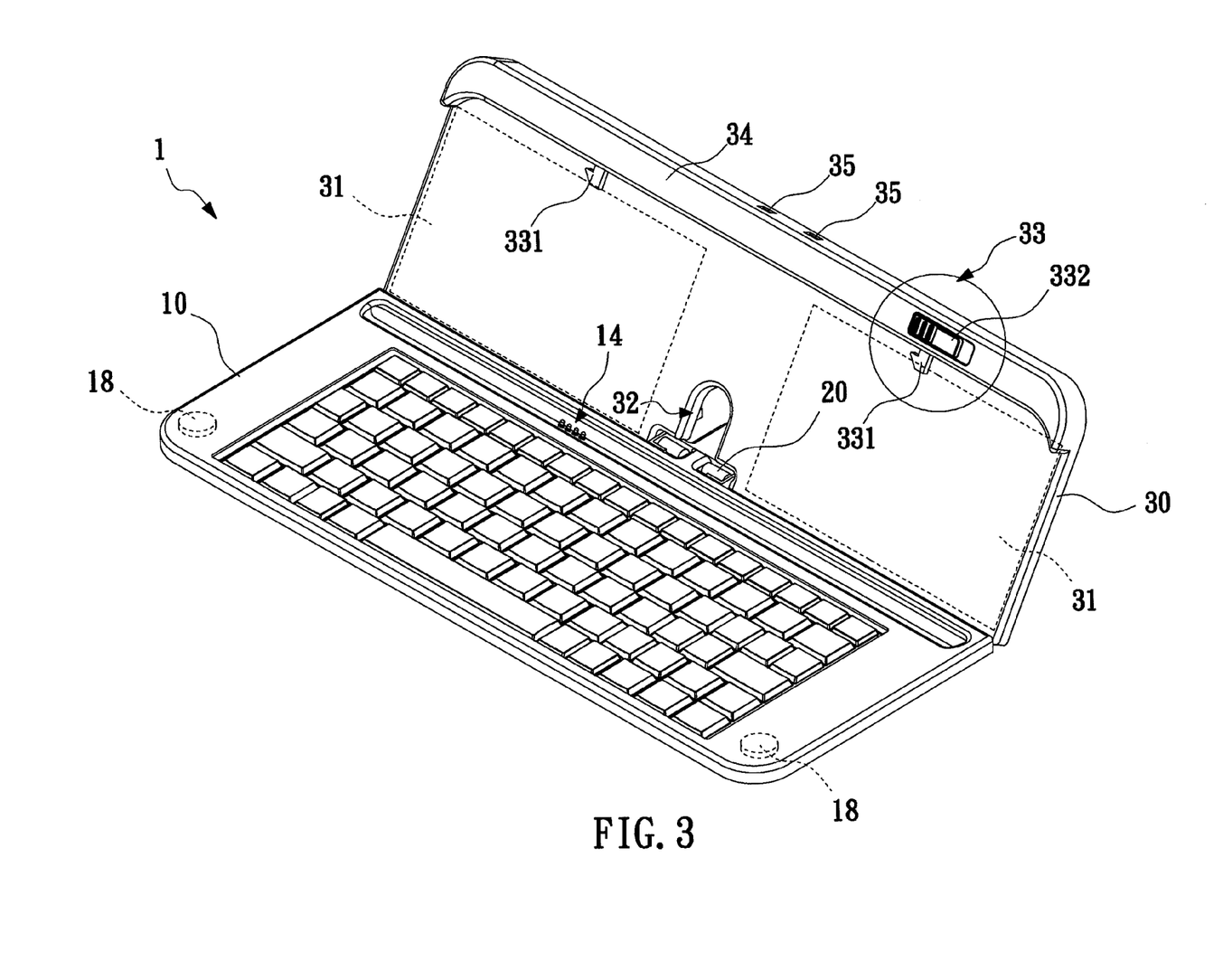
FIG. 3 is a downward vertical view of the first base body and the second base body of the support stand of the present invention while they are not on the same plane.
Figure 4A:
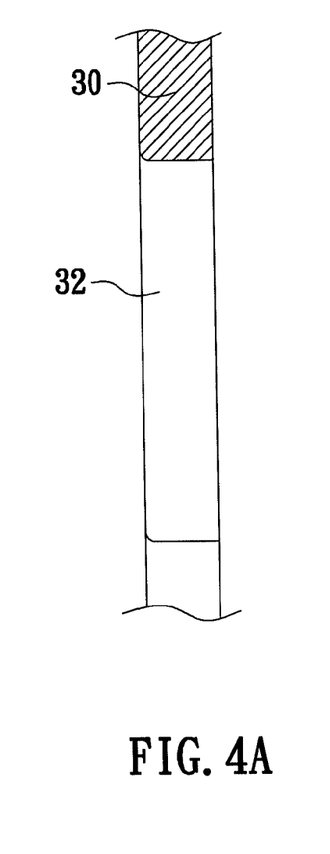
FIG. 4A is an enlarged profile of the hole in the second base body of the support stand of the present invention.
Figure 4B:
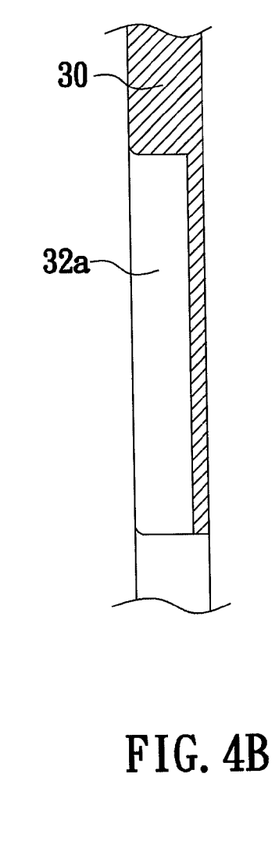
FIG. 4B is a profile of the groove in the structure of the hole, which can replace what is illustrated in FIG. 4A.
Figure 5:
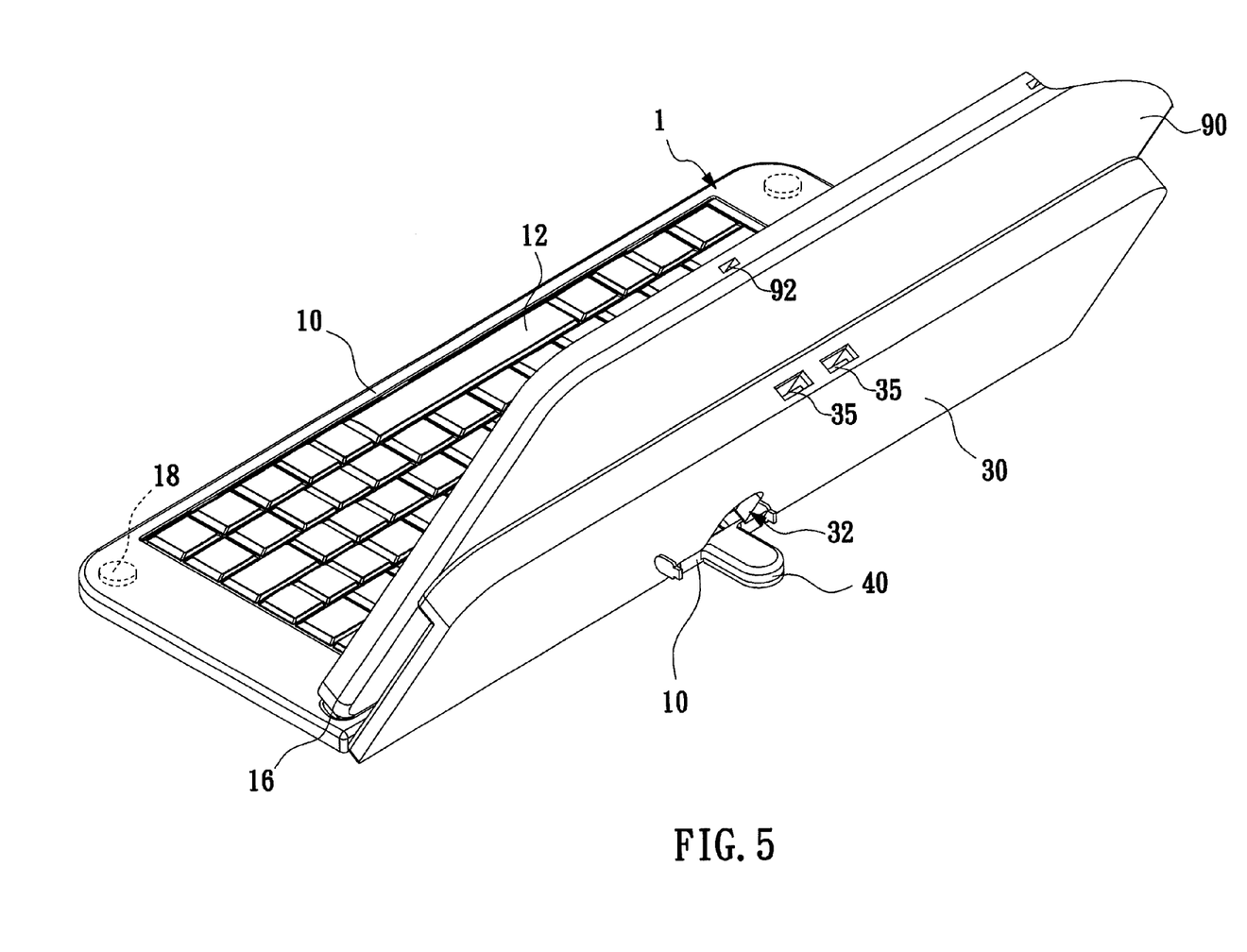
FIG. 5 is a rear view of the electronic device of the present invention when in use.
Figure 7:
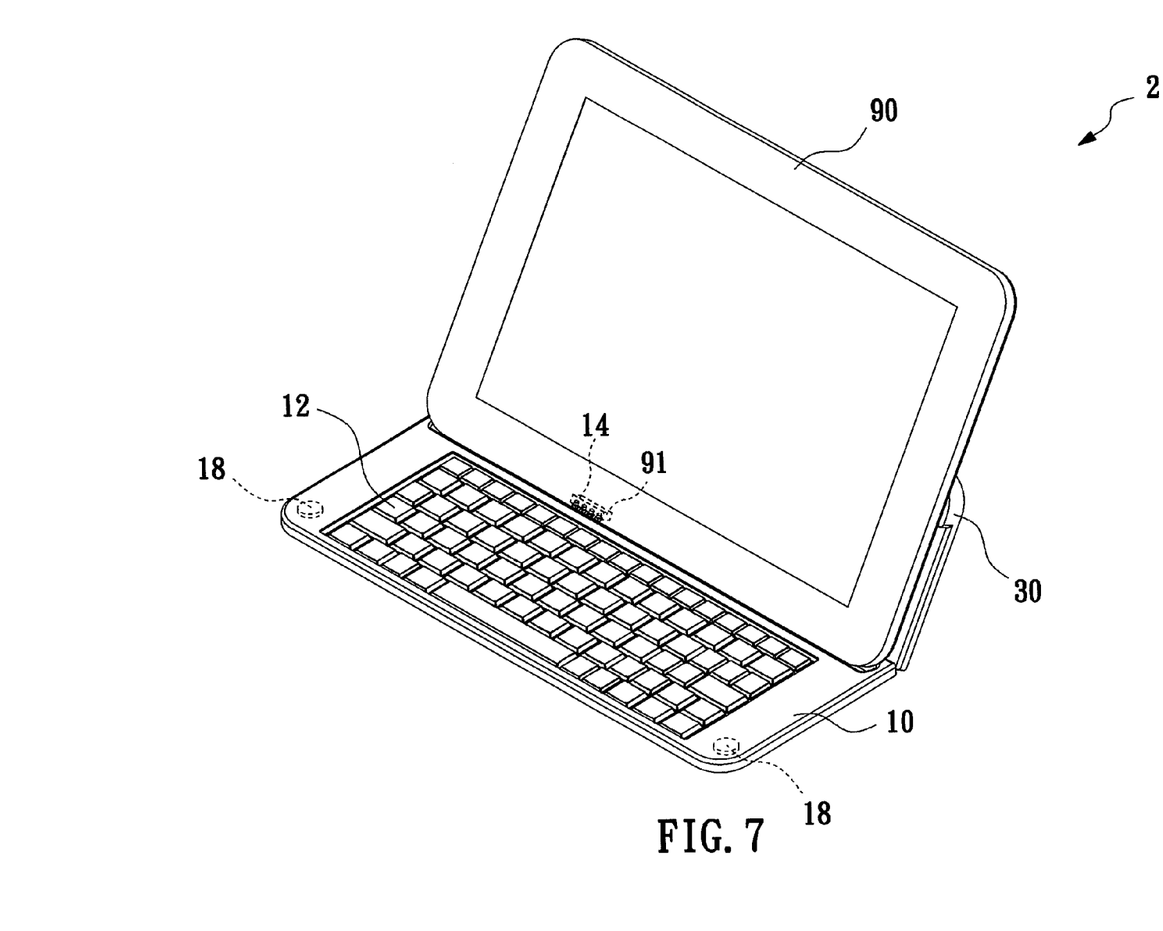
FIG. 7 is an illustration of the display device of the electronic device of the present invention while the display device is vertically inserted in the support stand.

Please refer to FIG. 1 to FIG. 5, as well as FIG. 7, for the following statements. FIG. 1 is a downward vertical view of the electronic device of the present invention while it is not in use. FIG. 2 is a downward vertical view of the support stand of the present invention. FIG. 3 is a downward vertical view of the first base body and the second base body of the support stand of the present invention while they are not on the same plane. FIG. 4A is an enlarged profile of the hole in the second base body of the support stand of the present invention. FIG. 4B is a profile of the groove in the structure of the hole, which can replace what is illustrated in FIG. 4A. FIG. 5 is a rear view of the electronic device of the present invention when in use. FIG. 7 is an illustration of the display device of the electronic device of the present invention while the display device is vertically inserted in the support stand.

As shown in FIG. 1, in one of the embodiments of the present invention, an electronic device 2 of the present invention comprises a display device 90 and a support stand 1. In the embodiments of the present invention, the display device 90 is a tablet computer, yet the present invention is not limited by the embodiments. The Display device 90 can also be any portable electronic product that has a display function, such as a cell phone or a wireless screen.

As shown in FIG. 2, in one of the embodiments of the present invention, the support stand of the present invention comprises a first base body 10, a connecting member 20, a second base body 30, and a support member 40.

In one of the embodiments of the present invention, the first base body 10 comprises an input device 12, a first electric connector 14, a groove 16, and a first retaining device 18. The first electric connector 14 connects electrically with the input device 12 via a circuit board (not shown in figures), such that a user can send information with the input device 12 through the first electric connector 14. In the embodiments of the present invention, the input device is a keyboard, yet the present invention is not limited thereto. For example, the input device 12 can be a touch control board, a scroll wheel, or a device provided for inputting, and it does not have to be a keyboard, which is shown in FIG. 2.

The first electric connector 14 is placed in the groove 16, so the second electric connector 91 of the display device 90 not only can connect electrically with the first electric connector 14, but it also stabilizes the display device 90 with the groove 16 when the display device 90 is placed roughly vertically and with one end leaning against the groove 16, as shown in FIG. 5 and FIG. 7.

In the embodiments of the present invention, the first retaining device 18 is a magnetic member, and its quantity is two. They are separately installed at the two corresponding sides of the input device 12. The corresponding spot of the display device 90 can be an iron member or a magnetic member. When the display device 90 faces down with the display surface shown in FIG. 1 facing downward and superposes face to face towards the first base body, they are intimately stabilized by the attraction of the magnetic force.

As shown in FIG. 2, in one of the embodiments of the present invention, the connecting member 20 is connected with the first base body 10. In the embodiments of the present invention, the connecting member 20 is a hinge structure, yet the present invention is not limited by the embodiments.

As shown in FIG. 3, in one of the embodiments of the present invention, the second base body 30 is connected with the connecting member 20, and the second base body 30 is rotatable relative to the first base body 10 through the connecting member 20. In one of the embodiments of the present invention, the second base body comprises at least one battery 31, a hole 32, a second retaining device 33, a flange 34, and at least one expansion port 35.

At least one battery 31 connects electrically with the first electric connector 14 via a circuit board (not shown) such that the power from battery 31 can be transmitted via the first electric connector 14. In the embodiments of the present invention, the quantity of the modules for the battery 31 is two, and they are placed inside the second base body 30, with each placed at the two sides of the hole 32. Yet the quantity of the modules for the batteries is not limited by what is addressed above. Also the possibility of positioning the battery 31 on the first base body 10 is not excluded. The hole 32 is installed to correspond to the support member 40 in order to hold the support member 40 when the first base body 10 and the second base body 30 are on the same plane (as shown in FIG. 2). Yet what is worth noting is that the area addressed above does not need to be designed as a penetrating type of hole (as shown in FIG. 4A). If the second base body 30 has sufficient thickness, it can be a capacity tank 32a instead, which holds the support member 40, as shown in FIG. 4B.

In the embodiments of the present invention, the second retaining device 33 comprises 2 two catches 331 and a switch member 332 which connects with the catches 331. The quantity of the switch member 332 can be one, and it is incorporated with the two catches 331 as a single unit, so that the movement of the two catches 33 can be controlled simultaneously with the switch member 332. Besides, the second retaining device 33 additionally comprises a spring member (not shown in figures) to function with the switch member 332 or the catches 331 in order to enable the catches to hold firmly. What is worth noting is that the present invention is not limited by the embodiments in which the switch member 332 works with the catches 331 as an example for the second retaining device 33. The second retaining device 33 can be a magnetic member or other retaining structure. No matter what the structure type is, the function of the second retaining device 33 is to incorporate and retain the display device.

In one of the embodiments of the present invention, the flange 34 is placed on one side of the second base body 30, and the second retaining device 33 is positioned at the place where the flange 34 is, wherein the height of the flange 34 is equal to the thickness of the display device 90 (as shown in FIG. 1), yet the present invention is not limited by this embodiment.

In one of the embodiments of the present invention, the at least one expansion port 35 is positioned at the place where the flange 34 is, and is used to connect with other devices. In the embodiments of the present invention, the quantity of the at least one expansion port is two, and the expansion port is a USB port, yet the present invention is not limited by the embodiments. For example, the expansion port 35 can be a mouse port, a LAN port, or any ports in other forms.

As shown in FIG. 5, in one of the embodiments of the present invention, the support member 40 is connected with the first base body 10. One of the ways to connect the two is to make the support member 40 part of the same, yet backward extended structure of the first base body 10. The support member 40 keeps the balance of the support stand 1 while the first base body 10 and the second base body 30 are not on the same plane, so that the support stand 1 does not tip over while the display device 90 leans against it. What is worth noting is that the position and quantity of the support member 40 of the present invention are not limited by what is shown in FIG. 5. The support member 40 of the present invention can be positioned on the two sides of the first base body 10, as long as it can be in accordance with the position and quantity of the hole 32.

Figure 6:
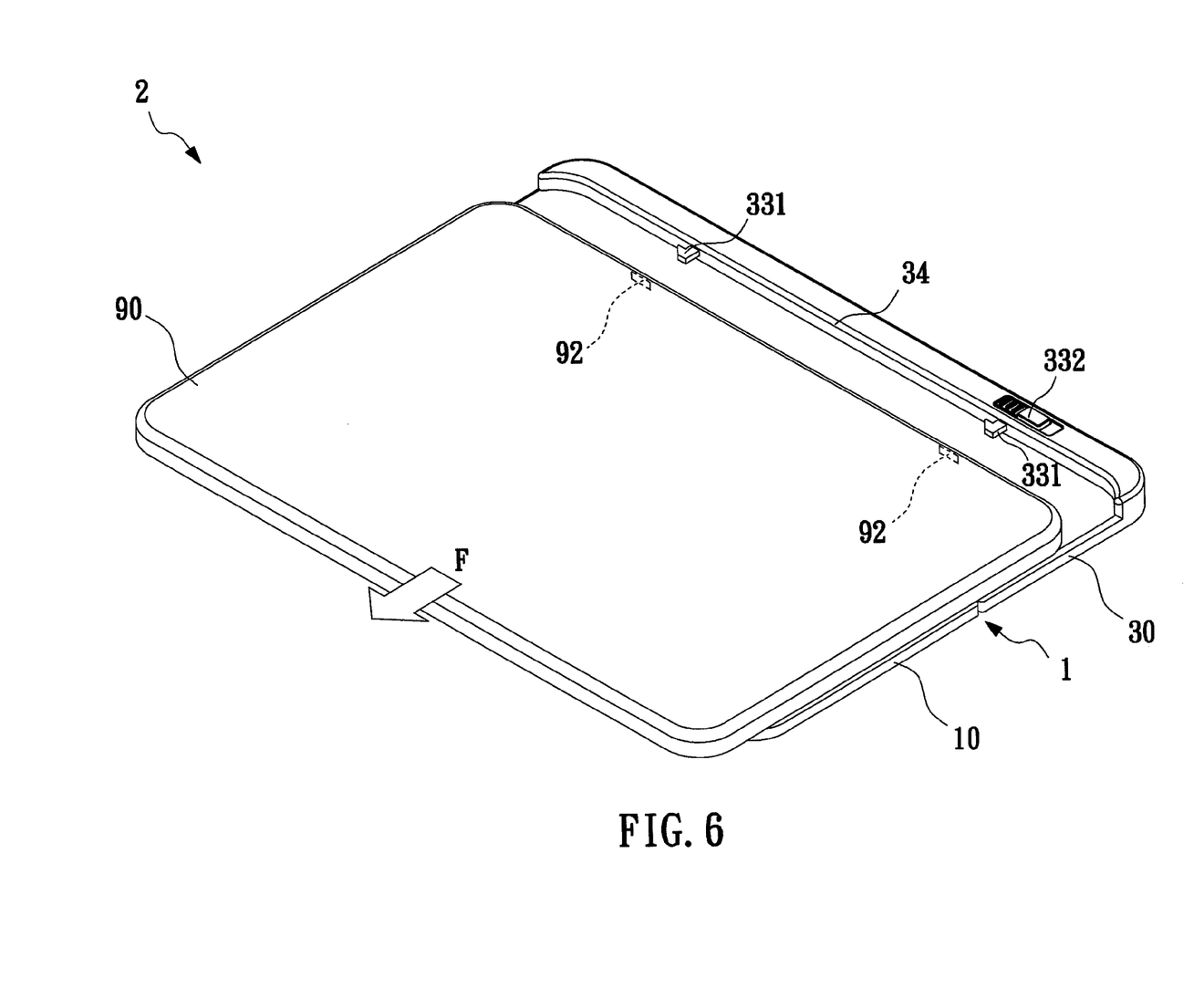
FIG. 6 is an illustration of the display device of the electronic device of the present invention while the display device is disengaged from the catch of the support stand.
Figure 8:
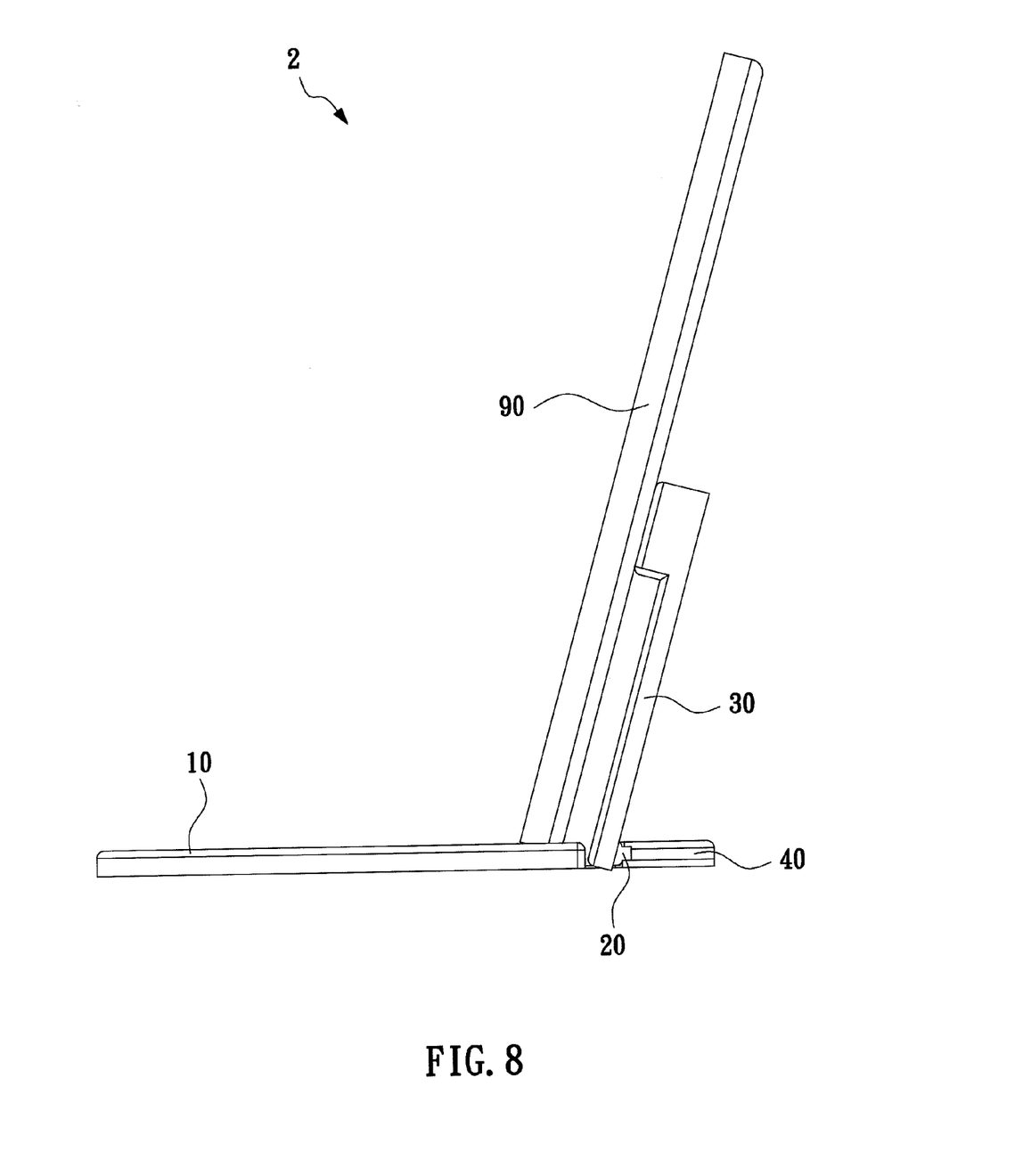
FIG. 8 is an illustration of the electronic device of the present invention while the electronic device is in use at an angle.
Figure 9:
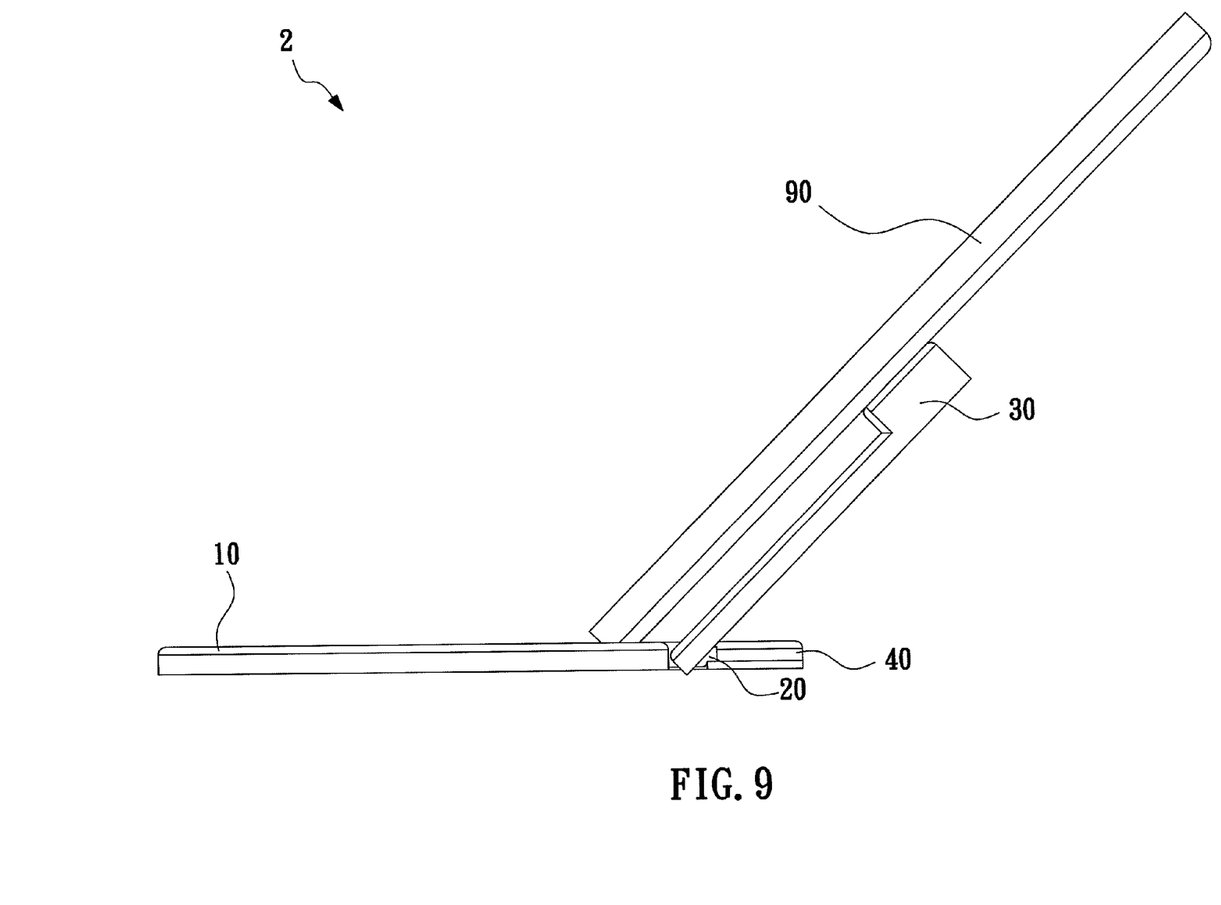
FIG. 9 is an illustration of the electronic device of the present invention while the electronic device is in use at a different angle.

Please continue on and refer to FIG. 1, FIG. 5, FIG. 7, as well as FIG. 6, FIG. 8, and FIG. 9. FIG. 6 is an illustration of the display device of the electronic device of the present invention while the display device is disengaged from the catch of the support stand. FIG. 8 is an illustration of the electronic device of the present invention while the electronic device is in use at an angle. FIG. 9 is an illustration of the electronic device of the present invention while the electronic device is in use at a different angle.

As shown in FIG. 6, the second base body 30 can lie flat and be level with the first base body 10 while the electronic device 2 of the present invention is not in use. At this time, the display device 90 can be intimately superposed on the support stand 1 with the display surface facing down and adjoining the flange 34. Thus on one hand, the back side of the display device 90 can be retained with the catches 331 of the second retaining device 33 being buckled in hole 92, and on the other hand, the front side of the display device 90 can be attracted by the magnetic member of the first retaining device 18 so that display device 90 is completely retained on the support stand 1. Also owing to the fact that the height of the flange 34 is equal to the thickness of the display device 90, the surface of the incorporated unit is quite flat (as shown in FIG. 1). As shown in FIG. 6, when a user wishes to use the display device 90, the user only needs to push the switch member 332 of the second retaining device 33 to unbuckle the catches 331. Then when the user applies sufficient force to move the display device 90 in the direction of arrow F in FIG. 6 and overcomes the attraction of the retaining device 18, the display device 90 is separated from the support stand 1.

As shown in FIG. 5 and FIG. 7, after the user removes the display device 90 from the support stand 1, the user can place the display device 90 roughly vertically on the support stand 1 and connect the display device 90 electrically with the first electrical connector 14 of the support stand 1 via the second electric connector 91. Thus the user can input data through the input device 12 of the support stand 1 and have it transmitted and displayed on the display device 90. Also, this enables the batteries 31 of the second base body 30 to transmit power to the display device 90 to prolong the time for which the display device 90 is used. Additionally, if the user wishes to connect other input, storage, or video/audio devices with it, the user can plug the devices in the expansion port 35 of the second base body 30 by using plug-in connectors, such that the devices can connect with the display device 90 in order to access or store data.

As shown in FIG. 8, in one of the embodiments of the present invention, the second base body 30 of the present invention is connected with the first base body 10 through the connecting member 20. The second base body 30 rotates through the connecting member 20 as it corresponds to the first base body 10. In the embodiments of the present invention, the user can further use the connecting member 20 to adjust the angle of the second base body 30 and the support member 40 (as shown in FIG. 9) so that the user can adjust the viewing angle as the setting varies. Besides the benefit of supplying the display device 90 with power and the capability of inputting data through the support stand 1, the support stand 1 of the present invention further enables the significant reduction of the weight and thickness of the electronic device 2 by directly having the second base body 30 as the base for the display device 90 to lean on. Therefore, the convenience of carrying it is greatly enhanced, and it is even more convenient to carry the display device 90 and the support stand 1 as an incorporated unit when the display device 90 is superposed and fastened on the support stand 1 on parallel planes as the display device 90 is not in use.

It is noted that the above-mentioned embodiments are only for illustration. It is intended that the present invention cover modifications and variations of present invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A support stand, which is used to place and fix a display device, comprising:
   a first base body having a first bottom surface, which comprises:
   an input device; and
   a first electric connector, which is electrically connected with the input device and provides the display device with electric connection;
   a connecting member, which is connected with the first base body;
   a second base body having a second bottom surface, which is connected with the connecting member so that the second base body rotates relative to the first base body via the connecting member to form a first state and a second state, wherein the entire first bottom surface of the first base body and the entire second bottom surface of the second base body are both situated on a same plane when the second base body is at the first state, and the entire first bottom surface of the first base body and the entire second bottom surface of the second base body are situated not on the same plane when the second base body is at the second state; and
   a support member having a third bottom surface, which is extended from the first base body and toward the second base body, and the support member and the first base body remain both situated on the same plane; when the second base body is at the first state, the support member is accommodated in the second base body so that the first bottom surface of the first base body, the second bottom surface of the second base body and the third bottom surface of the support member are all situated on the same plane; the support member is detached from and protrudes behind the second base body when the second base body is at the second state;
   whereby, the support stand is balanced by the protrusion and extension of the support member relative to the second base body after the second base body rotates relative to the first base body to form the second state, such that the display device can lean on the second base body.

2. The support stand as claimed in claim 1, wherein the second base body comprises a hole to hold the support member when the first base body and the second base body are on the same plane.

3. The support stand as claimed in claim 1, wherein the second base body comprises a capacity tank to hold the support member when the first base body and the second base body are on the same plane.

4. The support stand as claimed in claim 1, wherein the second base body comprises at least one battery electrically connected with the first electric connector.

5. The support stand as claimed in claim 1, wherein the first base body further comprises a groove in which the first electric connector is installed so that a second electric connector of the display device is simultaneously electrically connected with the first electric connector when the display device is placed in the groove with one side against the groove.

6. The support stand as claimed in claim 1, wherein the second base body comprises a second retaining device to fix the display device when the first base body and the second base body are located on the same plane and are intimately superposed by the display device.

7. The support stand as claimed in claim 6, wherein the second retaining device comprises at least one catch to be held in at least one buckle hole corresponding to and preserved on the display device.

8. The support stand as claimed in claim 6, wherein the second base body further comprises a flange around which the second retaining device is installed.

9. The support stand as claimed in claim 8, wherein the height of the flange is equal to the thickness of the display device.

10. The support stand as claimed in claim 8, wherein the second base body further comprises at least one expansion port which is installed around the flange.

11. The support stand as claimed in claim 7, wherein the second retaining device further comprises a switch member connected with the at least one catch to move the at least one catch.

12. The support stand as claimed in claim 1, wherein the first base body further comprises a first retaining device to incorporate with and fix the display device while the first base body and the second base body are located on the same plane and intimately superposed by the display device.

13. The support stand as claimed in claim 12, wherein the first retaining device is a magnetic member.

14. An electronic device comprising:
a display device which comprises a second electric connector and at least one buckle hole;
a support stand, which is used to place and fix the display device; the support stand comprises:
a first base body having a first bottom surface, which comprises:
an input device; and
a first electric connector, which is electrically connected with the input device and provides the display device with electric connection;
a connecting member, which is connected with the first base body;
a second base body having a second bottom surface, which is connected with the connecting member so that the second base body rotates relative to the first base body via the connecting member to form a first state and a second state, wherein the entire first bottom surface of the first base body and the entire second bottom surface of the second base body are both situated on a same plane when the second base body is at the first state, and the entire first bottom surface of the first base body and the entire second bottom surface of the second base body are situated not on the same plane when the second base body is at the second state; and
a support member having a third bottom surface, which is extended from the first base body and toward the second base body, and the support member and the first base body remain both situated on the same plane; when the second base body is at the first state, the support member is accommodated in the second base body so that the first bottom surface of the first base body, the second bottom surface of the second base body and the third bottom surface of the support member are all situated on the same plane; the support member is detached from and protrudes behind the second base body when the second base body is at the second state;
whereby, the support stand is balanced by the protrusion and extension of the support member relative to the second base body after the second base body rotates relative to the first base body to form the second state, such that the display device can lean on the second base body.

15. The electronic device as claimed in claim 14, wherein the second base body comprises a hole to hold the support member when the first base body and the second base body are on the same plane.

16. The electronic device as claimed in claim 14, wherein the second base body comprises a capacity tank to hold the support member when the first base body and the second base body are on the same plane.

17. The electronic device as claimed in claim 14, wherein the second base body comprises at least one battery electrically connected with the first electric connector.

18. The electronic device as claimed in claim 14, wherein the first base body further comprises a groove in which the first electric connector is installed so that the second electric connector is simultaneously electrically connected with the first electric connector when the display device is placed in the groove with one side against the groove.

19. The electric device as claimed in claim 14, wherein the second base body comprises a second retaining device to fix the display device when the first base body and the second base body are located on the same plane and intimately superposed by the display device.

20. The electronic device as claimed in claim 19, wherein the second retaining device further comprises at least one catch to be held in the at least one buckle hole.

21. The electronic device as claimed in claim 19, wherein the second base body further comprises a flange around which the second retaining device is installed.

22. The electronic device as claimed in claim 21, wherein the height of the flange is equal to the thickness of the display device.

23. The electronic device as claimed in claim 21, wherein the second base body further comprises at least one expansion port which is installed around the flange.

24. The electronic device as claimed in claim 20, wherein the second retaining device further comprises a switch member connected with the at least one catch to move the at least one catch.

25. The electronic device as claimed in claim 14, wherein the first base body further comprises a first retaining device to incorporate with and fix the display device while the first base body and the second base body are located on the same plane and intimately superposed by the display device.

26. The electronic device as claimed in claim 25, wherein the first retaining device is a magnetic member.

* * * * *